3,567,469
PROCESS FOR THE PRODUCTION OF DEHYDRATED PRODUCTS
Roberto Calderon-Pedroza and Isabel Resano-Gonzalez, Mexico City, Mex., assignors to CPC International Inc., New York, N.Y.
No Drawing. Filed Dec. 14, 1964, Ser. No. 418,318
Int. Cl. A23b 1/04, 3/04, 7/02
U.S. Cl. 99—204                                    12 Claims

ABSTRACT OF THE DISCLOSURE

Edible material is dehydrated by forming a dispersion of finely divided particles of the material in hydrophobic fluid and subjecting the dispersion to reduced pressure in the form of a thin, agitated film. The dispersion does not exceed about 3 millimeters when spread as a thin layer on a heated surface.

---

This invention relates to a new and improved process for dehydrating various materials, and particularly those which are sensitive to heat, i.e., suffer loss of various of their desirable properties upon exposure to heat. The invention is particularly applicable to heat sensitive materials of animal and vegetable origin, in fresh or cooked condition, wherein at least a part of the water is tightly bound by hydrocolloids present. In general, the dehydration is accomplished by a novel use of water immiscible substance, such as vegetable oils.

Various processes are known for partially or totally dehydrating heat sensitive materials, such as food products. However, they all have certain disadvantages, most of which appear in the quality of the final product. Generally, the properties of the material have been impaired due to long exposure to heat and/or by local overheating at certain points, particularly in products which have been totally dehydrated. As a result, the natural flavors are lost, off-flavors may be imparted by the overheating, or the products are difficult to rehydrate. Those processes which dehydrate the materials with the least loss of their desirable properties are too expensive to permit their use on an economical basis.

It is an object of the present invention to provide a new and improved process for dehydrating various products, particularly those which lose some of their desirable properties upon drying. It is another object of the invention to provide a process for dehydrating various materials whereby thermally induced changes in the product, such as those resulting from prior art processes, are reduced substantially or avoided altogether. It is another object of the invention to provide a process for dehydrating products of animal or vegetable origin wherein at least a part of the water is tightly bound by hydrocolloids present, whereby the resultant products retain their desirable properties and can be rehydrated to form products having substantially the same properties, particularly organoleptic properties, as the products had prior to dehydration. Another object of the invention is to provide a process for rehydrating said resultant products with the aid of hydrocolloids or other adjuncts. Yet another object is to provide a new process for dehydrating materials containing flavoring compounds whereby substantially all of such compounds, particularly volatile compounds, are retained in the dehydrated product. Another object is to provide an improved process for dehydration of various materials wherein a novel use is made of hydrophobic or water immiscible substances, e.g., vegetable oils. Still another object is to provide a process for dehydrating food products by means of hydrophobic substances wherein the flavor of the dehydrated product is more pronounced than that of the original product, due to release of volatiles and dissolution thereof in the hydrophobic substances during the process.

The present invention comprises dehydrating various materials by forming a stable dispersion of said materials in finely divided form and a hydrophobic substance, and continuously and rapidly evaporating moisture from the dispersion in a wiped-film type of evaporator. In this type of evaporation, a thin layer of the material to be dried is spread by means of a wiping blade against a heated surface and under vacuum and the resultant heated layer is continuously and rapidly displaced to the outlet of the system by means of the same blade. Simultaneously the interface of the material in contact with the heated surface, as well as the opposite one, directly exposed to the vacuum, are renewed, also, by means of the same blade.

The use of hydrophobic substances, such as vegetable oil, in removing moisture from food products is known. The use of evaporators, such as the wiped-film type, to dehydrate food and other products is also known. However, as has already been mentioned, prior art processes have numerous disadvantages. Moreover, the present invention involves a marked departure from prior art methods as can be more fully appreciated from the description which follows hereinafter.

In carrying out the invention, a stable dispersion of the material to be dehydrated and the hydrophobic substance should first be prepared. The term "stable," as used herein, is intended to include dispersions which are stable only long enough to permit the same to be spread in a thin layer in the evaporator as well as those which are stable indefinitely.

In preparing the materials to be dispersed, it may be necessary to first remove some portion of the original material, for example, peels and seeds from fruits and vegetables or skin and bones from meat. The material thus obtained is then chopped or ground directly to a particle size not exceeding about 100 microns in diameter. Depending upon the sensitivity of the material, chopping and grinding should take place in an inert atmosphere and with the addition of preservatives and, in some cases, under refrigeration as well. Some materials may be frozen prior to grinding and the grinding carried out at low temperatures. Also the grinding may be done prior to the addition of the hydrophobic substance, but is preferably done in its presence to prevent the escaping of volatile constituents and to avoid overheating during grinding. Additives may be used at various stages in the preparation of the dispersion to inhibit discoloration, browning, oxidative deterioration, bacterial spoilage and the like.

If the material contains a high percentage of water, such as tomatoes, it may be treated by mechanical action to break the cells thereby releasing a certain amount of juice. In order to retain flavoring compounds in the juice, the mechanical operation may be carried out in the presence of the hydrophobic substance, or the latter may be added after such operation and mixed thoroughly with the material. Following this, the free juice may be eliminated by mechanical means from the rest of the pulp.

Materials wherein the water is held tenaciously by means of hydrocolloids may be treated prior, during or after grinding, with hydrolyzing enzymes to decrease the water holding capacity of such hydrocolloids. Some time may be allowed to elapse under controlled temperature and pH conditions, to increase the release of water. This treatment releases a greater amount of free water upon grinding than would otherwise be possible and permits its removal thereof by mechanical means, leaving less to be removed by evaporation.

It may also be desirable in some cases to treat the ground pectinous material to remove enzymes already present from it. For example, enzymes may be removed from avocado pulp, or the like, by grinding it in the presence of the hydrophobic substance and, if convenient, a dilute solution of calcium chloride may be added as well to reduce the dispersibility in water of the pectinous material and thus allow for a sharper centrifugal removal of water phase, which contains extracted enzymes.

Many of the materials to be dehydrated will contain natural compounds which behave as emulsifying or dispersing agents to produce a stable dispersion with the hydrophobic substance, but, if necessary, well-known emulsifying or dispersing agents for hydrophobic substances and water may be added to form a stable dispersion suitable for purposes of the invention.

The hydrophobic material may be added prior, during or after grinding but, at any rate, the products must be blended properly to obtain a high degree of dispersion. Should the dispersion exhibit too low viscosity for proper spreading, as specified hereinafter, a hydrocolloid may be added. If the viscosity exceeds the value specified either more hydrophobic substance may be added or the material to be dried may be treated mechanically to allow enzymatic breakdown of the hydrocolloids, an operation which may be carried out in a shorter period of time by addition of hydrolytic or other enzymes. In some instances, it may be desirable to allow the enzymatic breakdown to take place at low temperatures, e.g., at or just above freezing.

The kind of dispersion to which we refer in the specification and claims consists of the proper mixture of components having the following characteristics:

(1) The diameter of the individual particles therein should not exceed about 100 microns and they should be evenly distributed in the mass.

(2) The viscosity thereof should not exceed about 200,000 centipoises measured at the operating temperature of the inlet of the dehydrating equipment under vacuum. The viscosity may be measured indirectly through the net power consumption of the feeding pump used. The viscosity should be sufficiently high to spread in a thin layer on the heating surface of the dryer and will vary with the material to be dehydrated and the hydrophobic substance used.

The practical range of operating ratios of hydrophobic substance to the solids of the material to be dehydrated, on a dry substance basis, has a minimum of about 0.1 hydrophobic to 1 of solids, and an upper limit of about 6 hydrophobic to 1 of solids.

Any material, but particularly heat sensitive materials, may be treated by the process of the present invention. It is particularly applicable to heat sensitive materials of animal and vegetable origin, in fresh or cooked condition, wherein at least a part of the water is tightly bound by hydrocolloids present. Among the various materials which may be included are: fruits, in general; vegetables, in general; pectinous and proteinaceous materials, e.g., gelatin; fish and seafood products; meat and meat byproducts; pulps from friuts and vegetables, such as from avocado and tomato; onions; garlic; horseradish; fruit juices; vitamin extracts, e.g., those containing vitamins A, C and D; medicinal plant materials; thixotropic clay gels and other inorganic gels when specific allotropic varieties are required; heat sensitive pigments and dyes; and the like. The invention is also applicable to mixtures of various materials, particularly food products.

The hydrophobic substance should have the following characteristics:

(1) It should form by mechanical means a stable dispersion with the finely divided material which it is desired to dehydrate, either by itself or through the addition of emulsifying and/or dispersing agents.

(2) It should be liquid at the inlet temperature of the evaporating equipment. In most instances however, it will also be a liquid at the temperature used to make the dispersion.

(3) The melting point thereof should be lower than the temperature used in the dehydrating operation.

(4) The vapor pressure thereof should be low enough to prevent its removal from the system along with the water evaporated therefrom during the dehydrating operation.

(5) If volatile constituents are to be preserved, the hydrophobic material should exhibit high solubility for such volatiles.

Any hydrophobic or water immiscible substance having the above characteristic may be used. When a food product is being dehydrated, the hydrophobic material should be edible. Among the hydrophobic materials suitable for food use are vegetable oils, particularly those which have low polarity. Mixtures of such oils may be used also. Glycerides with different degrees of esterification, such as glyceryl monostearate, glyceryl disterate, glyceryl monopalmitate and glyceryl dipalmitate, may be used also. Among the non-edible hydrophobic substances which are satisfactory, cetyl alcohol, microcrystalline waxes, spermacetic and low melting point hydrocarbons may be cited as typical. There may be sufficient natural hydrophobic substance present in the material to be dehydrated, e.g., vegetable oil, in certain food products, so that little, if any, additional hydrophobic substance need be added to form the stable dispersion.

As already mentioned, a wiped-film type of evaporator is used for purposes of dehydration in the present invention. This type of evaporator or dryer operates under vacuum and the material fed thereto is continuously dehydrated in the form of an agitated thin layer. In addition, this type of equipment provides a short holding time for drying and low volume capacity. The wiped-film type of evaporator cannot be used to completely dehydrate systems having high consistency or viscosity, such as are known in the prior art, or used only disadvantageously, unless special means are provided to remove the product at the outlet. Even then there are the disadvantages of frictional conditions and/or additional power requirements along with the possibility of scorching and local overheating. Generally these phenomena result from the fact that the viscosity of the system increases as water is removed. Therefore, it was indeed surprising to discover that such equipment is advantageous in the process of our invention and that it could be used on dispersions having the very high viscosities previously set forth. This is due to the fact that the viscosity of such dispersions decreases in the last stages of the dehydration, upon removing water from said dispersions.

The dispersion to be dehydrated should be spread in a thin layer onto the heated surface of the evaporator to a thickness not exceeding about 3 mm. The residence time of the individual particles in the thin layer of the dispersion in the evaporator may vary from about 2 or 3 seconds to about 10 minutes. The temperature may vary in accordance with known principles, but, generally, the temperature used in the evaporation should be such that the temperature of the resultant dehydrated product at the outlet of the evaporator does not exceed about 65° C. for heat sensitive materials and about 100° C. for those products which have been previously cooked or require such a temperature level to develop adequate final flavor.

The resultant dehydrated products made in accordance with the process above described may be used as such or, if too much hydrophobic substance e.g., vegetable oil, is present, it may be removed and reused in the process, or otherwise handled, such as by refining and then reusing. The present invention permits in many instances the direct reuse of the hydrophobic substance because its properties have not been substantially impaired by the dehydration process.

When the hydrophobic substance is present in the dehydrated product in an amount in excess of that desired, the excess may be removed by any adequate complementary operation, such as decantation, filtration, centrifugation, expression, or solvent extraction or by combination of these and/or other operations. It is particularly advantageous when the dehydrated product contains little or no fibrous material to add edible fibers or other types of filter aids after centrifugation, filtration or decantation to make possible the use of expression devices (filter presses, expellers) to remove the hydrophobic material. The fiber or filter aid may be left in the final product or eliminated by mechanical means such as shredding or mild attrition followed by screening or air separation. The separated portion of the hydrophobic substance may be partially or totally recirculated in the process, depending upon its effects on the finished product.

The dehydrated product may require conditioning so that it may be easily rehydrated and regenerated into a product having appearance, consistency and organoleptic properties similar to those of the original product, or of different specifications as required. The adjuncts used should be able to either absorb water or easily disperse in it. Among the many suitable products, we have found that the pectins, alginates, carrageenins, gums, mucilages, modified starches, starch derivatives such as ethers or esters, dextrines and cellulose derivatives may be satisfactory when used in adequate amounts and in proper combinations. In some cases, it may be necessary to add emulsifiers and antioxidants as well.

Various advantages of using a hydrophobic substance in the present invention have been mentioned already. It should also be noted that the hydrophobic substance, such as vegetable oil in the dispersion, forms a film directly upon the heating surface of the evaporator and prevents sticking of the various particles to the surface. In the absence of hydrophobic substances, the dehydration process may form scale upon the heating surface thereby interfering with efficiency of evaporation and impairment of the properties of the final product.

The hydrophobic substance also acts as a lubricant in any other part of the equipment to allow free flow of the material until it leaves the system. This also avoids an undesirable residence time of the heat sensitive material in the system and the formation of heat denatured or adversely modified portions of the product being dehydrated.

The use of a hydrophobic substance, in addition to the oil that may already be present in a given product, tends to reduce the losses of valuable volatiles through their retention in the hydrophobic phase. These often valuable volatiles are likely to show a higher concentration in the oil phase than in water phase, due to their distribution coefficients in oil-water systems. The losses of volatiles due to evaporation from a true hydrophobic solution are relatively low as a result of the usually small concentration of such volatiles and the comparatively low vapor pressure of the hydrophobic substance. This concentration remains low because the amount available of the hydrophobic substance remains practically constant, since it does not substantially evaporate.

In a system such as used in the present invention, the viscosity of the system decreases as water is removed therefrom thereby permitting the use of film type evaporators. As already mentioned, this is the reverse of prior art processes using film type evaporators, wherein the viscosity of the system increases as water is removed with concomitant undesirable results.

One of the most important advantages of our invention is that the products obtained are easily rehydratable because they are not denatured nor damaged in any appreciable way.

The invention has the further important advantage that it can be carried out in well-known equipment under simple and economical operating conditions.

The following examples describe the nature of our invention with respect to the dehydration of heat sensitive materials. These specific examples are to be regarded as merely informative and typical and not as limiting the invention in any way.

EXAMPLE NO. 1

One thousand grams of avocado pulp cooled to about 5° C. and having a moisture content of 69 percent were mixed with a dilute ascorbic acid solution and the mixture was fed into a disk mill, at the same time that a stream of $CO_2$ was injected into the system. The inert atmosphere produced by the $CO_2$ prevented the contact of oxygen with the avocado pulp. The amount of ascorbic acid added to the pulp was 0.1 percent, fresh pulp weight basis.

After disintegrating, the resulting paste of avocado was mixed with 200 grams of sesame oil at about 5° C. and, then, the mixture was passed through a colloidal mill, while the inert atmosphere of $CO_2$ was still maintained.

The homogenized mixture was then fed to a short hold-up evaporator (wiped-film type) at a rate of 1000 grams per hour. The residence time of the material in the evaporator was of 4 minutes and the maximum temperature reached by the product in this equipment was 42° C. After properly mixing all of the pulp and segregated oil coming out from the evaporator, the resulting product had a moisture content of 4 percent.

A mixture of hydrocolloids and other materials was separately prepared with the following composition:

|  | Percent |
| --- | --- |
| Sodium chloride | 10.5 |
| Pectin, high viscosity | 13.0 |
| Methyl-cellulose, 4000 cps. | 20.0 |
| Dextro-maltose | 19.0 |
| Dried skim milk | 37.5 |

Ten grams of this mixture were added to an amount of dehydrated material equivalent to 100 grams of the original pulp. The blend was bottled in airtight containers under nitrogen atmosphere. The blend was kept under these conditions, at room temperature for several weeks, at the end of which it did not show any substantial change in flavor and color.

The rehydration of this product was carried out by adding water to it, in the amount of approximately 2.5 times the weight of the dehydrated material, with the aid of a fork. A product with physical and organoleptic characteristics similar to the original avocado pulp was obtained. After 3 weeks, unlabeled samples of the regenerated avocado and fresh ground avocado pulp were given to 9 persons. Two of them noticed a slightly stronger taste to avocado flavor in the regenerated avocado samples with no other difference in taste.

EXAMPLE NO. 2

Example No. 1 was repeated using sodium bisulphite in place of ascorbic acid with substantially the same results.

EXAMPLE NO. 3

One thousand grams of avocado pulp having a moisture content of 72 percent were mixed with sodium ascorbate solution and the mixture was fed into a disk mill, at the same time that a stream of $CO_2$ was injected into the system. The amount of sodium ascorbate added to the pulp was equivalent to 0.1 percent, fresh pulp weight basis.

After disintegrating, the resulting paste of avocado was mixed with 350 grams of sesame oil and, then, the mixture was passed through a colloidal mill, while the inert atmosphere of $CO_2$ was still maintained.

The homogenized mixture was then fed to a short hold-up evaporator (wiped-film type) at a rate of 840 grams per hour. The residence time of the material in the evaporator was of 3 minutes and the maximum temperature reached by the product in this equipment was 45° C. After properly mixing all of the pulp and segregated oil coming out from the evaporator, the resulting product had a moisture content of 4.7 percent.

A mixture of hydrocolloids and other materials was separately prepared with the following composition:

|  | Percent |
| --- | --- |
| Sodium chloride | 13.5 |
| Pectin, high viscosity | 16.0 |
| Methyl-cellulose, 4000 cps. | 24.5 |
| Dried skim milk | 46.0 |

Seventeen grams of this mixture were added to an amount of dehydrated material equivalent to 100 grams of the original pulp. The blend was bottled in airtight containers under nitrogen atmosphere. The product was kept under these conditions, at room temperature, for several weeks, at the end of which it did not show any substantial change in flavor or color.

EXAMPLE NO. 4

Example No. 3 was repeated using sodium bisulphite in place of sodium ascorbate and substantially the same results were obtained.

EXAMPLE NO. 5

One thousand grams of avocado pulp having a moisture content of 67 percent were mixed with sodium ascorbate solution and the mixture was fed into a disk mill, at the same time that a stream of $CO_2$ was injected into the system. The amount of sodium ascorbate added to the pulp was equivalent to 0.1 percent, fresh pulp weight basis.

After disintegrating, the resulting paste of avocado was mixed with 400 grams of sesame oil and, then, the mixture was passed through a colloidal mill while the inert atmosphere of $CO_2$ was still maintained.

The mixture was then fed to a short hold-up evaporator at the rate of 1000 grams per hour. The residence time of the material in the evaporator was of 3.5 minutes and the maximum temperature reached by the product in this equipment was 53° C. After properly mixing all of the pulp and segregated oil coming out from the evaporator, the resulting product had a moisture content of 2 percent.

A mixture of hydrocolloids and other materials was separately prepared with the following composition:

|  | Percent |
| --- | --- |
| Sodium chloride | 10.5 |
| Pectin, high viscosity | 13.0 |
| Methyl-cellulose, 4000 cps. | 20.0 |
| Dextro-maltose | 19.0 |
| Dried skim milk | 37.5 |

Twenty grams of this mixture were added to an amount of dehydrated material equivalent to 100 grams of the original pulp. The blend was bottled in airtight containers under nitrogen atmosphere. This product was kept under these conditions at room temperature for several weeks, at the end of which it did not show any appreciable change in flavor or color.

EXAMPLE NO. 6

One thousand grams of avocado pulp having a moisture content of 70 percent were mixed with sodium ascorbate solution and the mixture was fed into a disk mill, at the same time that a stream of $CO_2$ was injected into the system to avoid the inclusion of oxygen bubbles in the avocado pulp. The amount of sodium ascorbate added to the pulp was equivalent to 0.1 percent, fresh pulp weight basis.

After disintegrating, the resulting paste of avocado was mixed with 300 grams of sesame oil and passed through a colloidal mill, while the inert atmosphere of $CO_2$ was still maintained.

The homogenized mixture was then fed to a short hold-up evaporator at a rate of 1000 grams per hour. The residence time of the material in the evaporator was of 4 minutes and the maximum temperature reached by the product in this equipment was 40° C. The resulting product was centrifugated to separate the solids from the oil. This oil was recirculated in the process. After properly mixing all of the pulp and segregated oil coming out from the evaporator, the product had a moisture content of 5 percent.

A mixture of hydrocolloids and other materials was separately prepared with the following composition:

|  | Percent |
| --- | --- |
| Sodium chloride | 12.5 |
| Pectin, high viscosity | 25.0 |
| Dried skim milk | 61.5 |
| Sodium alginate, high viscosity | 1.0 |

Eight grams of this mixture were added to an amount of dehydrated material equivalent to 100 grams of the original pulp. The blend was bottled in airtight containers under nitrogen atmosphere. This product was kept under these conditions at room temperature for 3 weeks, at the end of which it did not show any substantial change in flavor or color.

EXAMPLE NO. 7

Chicken was partially fried in sesame oil, the bones were removed and the meat ground. Sesame oil was added to the meat in the ratio 1:1, weight basis, and then fed to a colloidal mill. The obtained dispersion of chicken in oil was fed to a short hold-up pilot evaporator of the agitated film type at a rate of 5300 grams per hour. After a residence time of 16 seconds in the evaporator the moisture of the chicken oil dispersion was reduced to only 0.7 percent. The temperature of the dispersion fed to the evaporator was 26° C., while the temperature of the dispersion leaving the evaporator was 93° C. The dehydration process was carried at an absolute pressure of 60 mm. of mercury.

About 90 percent of the added oil was removed from the dehydrated chicken dispersion by filtration. The product had a good taste and a light chicken meat color even after five weeks of being stored under nitrogen.

EXAMPLE NO. 8

Ground cooked chicken meat was mixed with sesame oil in the ratio 2:1, weight basis, and passed through a colloidal mill. The dispersion was fed to a laboratory size short hold-up agitated-film type evaporator at a rate of 2000 grams per hour. The initial water content of the chicken was 56 percent and after a residence time of 39 seconds in the evaporator a dispersion of chicken in oil was obtained in which no water content was detected by the toluene distillation method. The temperature of the dispersion fed to the evaporator was 29° C. and the temperature of the dispersion leaving the evaporator was 73° C. The dehydration was carried at an absolute pressure of 65 mm. of mercury.

From the dehydrated chicken dispersion about 80 percent of the oil was removed by filtration. The product had a light color characteristic of chicken meat color and a good taste even after 6 weeks of storage under nitrogen. It was found possible to reuse centrifugated oil in successive operations. Products obtained were equally satisfactory.

EXAMPLE NO. 9

A total of 3150 grams of tomatoes were submerged one minute in boiling water and then the peel was removed. The portion of tomato removed was 18.0 percent of the original tomato weight. The resultant pulp was finely ground and screened to remove the seeds which represented 1.6 percent of the tomato weight. Then, a clear liquid was removed from the pulp by centrifuging at 700 G., keeping the product at 11°–14° C. This liquid represented the 48.5 percent of the original tomato.

The resulting tomato pulp was mixed with sesame oil in the proportion of 5 parts of oil per one part of tomato solids and the mixture was fed to a colloidal mill.

The homogenized tomato mixture was then fed to a short hold-up evaporator of the wiped-film type at a rate of 1800 grams per hour. The residence time of the product in the evaporator was of 1.5 minutes and the maximum temperature reached by the product in this equipment was 49° C.

The resulting dehydrated product had a moisture content of 14.5 percent, wet basis. From this product a red oil, having a weight equivalent to 74 percent of the dehydrated product was separated by centrifugation. This oil had the organoleptic properties of tomato. The partially deoiled pulp was rehydrated by the addition of an amount of water corresponding to that of the original tomato pulp. A product with a pink color and with a taste of fresh tomato was obtained.

EXAMPLE NO. 10

Whole tomatoes, weighing 4070 grams, were submerged in boiling water for one minute to facilitate the removal of the peel, which represented 8 percent of the original weight of the tomatoes.

The peeled tomatoes were pulped and mixed with sesame oil in a ratio of 1.5 parts of oil per one part of seed free tomato solids. This mixture was screened to remove seeds which had a weight equivalent to 1.9 percent of the tomatoes and was then centrifuged at 700 G. to remove the watery phase. This was equivalent to 67 percent by weight of the amount of the tomatoes.

The concentrated mixture, having 63 percent water was homogenized in a colloidal mill, and then fed to a short hold-up pilot evaporator of the wiped-film type at a rate of 930 grams per hour. The evaporation was carried out at an absolute pressure of 40–50 mm. of mercury. The residence time in the equipment was 4 minutes and the maximum temperature reached was 51° C.

The resulting product had a moisture content of 3.5 percent and segregated under centrifugation 57.3 percent of its weight as a red color oil with the typical flavor of raw tomato. Upon rehydration, the residual tomato paste gave a product of a light pink color and a satisfactory raw tomato taste.

EXAMPLE NO. 11

The peel of 4500 grams of tomatoes were removed through scalding in boiling water, so that 8.3 percent of the tomatoes weight was removed. The peeled tomatoes were ground in a hammer mill and then the product was passed through a screen to remove the seeds. The separated seeds weighed 2.6 percent of the original fresh tomatoes.

The tomato pulp was mixed with 4 parts of sesame oil per one part of tomato solids. A water suspension having a weight equivalent to 58 percent of the mixture was eliminated by centrifugation at 700 G. It exhibited only a mild tomato flavor as a result of the oil being present during grinding and centrifugation which this time allowed for a sharper separation of phases. The resulting concentrated tomato-oil mixture, having a water content of 72.5 percent, was homogenized in a colloidal mill while keeping its temperature below 20° C. by adding Dry Ice.

Then, the homogenized product was fed to a short hold-up pilot evaporator of the wiped-film type at a rate of 690 grams per hour. The evaporation was carried out at an absolute pressure of 60 mm. of mercury. The product had a residence time in the evaporator of 7.5 minutes and reached a maximum temperature of 55° C. The product left the evaporator with a moisture content of 5.9 percent.

The dehydrated product segregated under centrifugation 69 percent of a red oil having a fresh flavor of tomato. Upon rehydration, the residual tomato paste gave a product with a redish pink color and a typical raw tomato taste.

EXAMPLE NO. 12

One thousand grams of avocado pulp having a moisture content of 63 percent were mixed with a small amount of ascorbic acid solution so as to have a concentration of 0.1 percent of the antioxidant in the avocado, and the mixture was then fed into a colloidal mill, at the same time that a stream of $CO_2$ was injected into the system.

After disintegrating, the resulting avocado paste was mixed with 100 grams of melted coconut oil and thoroughly homogenized while the inert atmosphere of $CO_2$ was still maintained.

The homogenized mixture was then fed to a short hold-up pilot evaporator of the wiped film type at a rate of 1900 grams per hour. The residence time of the material in the evaporator was 2 minutes at an absolute pressure of 50 mm. of mercury. The maximum temperature reached by the product in this equipment was 49° C. After properly mixing the pulp and the segregated oil both coming out together from the evaporator, the product had a moisture content of 2.8 percent.

A mixture of hydrocolloids and other materials was separately prepared with the following composition:

| | Percent |
|---|---|
| Sodium chloride | 10.0 |
| Pectin, high viscosity | 25.0 |
| Sodium alginate, high viscosity | 1.0 |
| Dried skim milk | 64.0 |

Eight grams of this mixture were added to an amount of dehydrated material equivalent to 100 grams of the original pulp. The blend was bottled in airtight containers under nitrogen atmosphere. The blend was kept under these conditions, at room temperature for several weeks, at the end of which it did not show any substantial change in flavor or color.

The rehydration of the product was carried out by adding water to it, in the amount of approximately three times the weight of the dehydrated material, with the aid of a fork. A product with physical and organoleptic characteristics closely resembling those of the original avocado pulp was obtained.

What is claimed is:

1. A process for dehydrating an edible material that normally contains moisture, and that is selected from the class consisting of fruits, meats, vegetables and seafood comprising:
    forming a dispersion in a hydrophobic, edible liquid of finely divided solid particles of the edible material, said dispersion not exceeding about 3 millimeters in thickness when spread as a thin layer onto a heated surface;
    dehydrating the particles of the edible material by subjecting said dispersion to reduced pressure at an elevated temperature in the form of a thin, agitated film over a short time period; and
    recovering a slurry of discrete, dehydrated particles of the edible material in the liquid.

2. A process in accordance with claim 1 wherein the particle sizes of the edible material in the dispersion are not in excess of about 100 microns.

3. A process in accordance with claim 2 wherein the dispersion has a viscosity not in excess of about 200,000 centipoises.

4. A process in accordance with claim 3 wherein the dispersion is subjected to the dehydrating step for a time period in the range from about 2 seconds to about 10 minutes.

5. A process in accordance with claim 4 wherein the dehydrating temperature does not exceed 100° C.

6. A process in accordance with claim 5 wherein the hydrophobic liquid is an edible vegetable oil.

7. A process in accordance with claim 6 wherein the edible material is chicken meat.

8. A process in accordance with claim 6 wherein the edible material is tomato pulp.

9. A process in accordance with claim 6 wherein the edible material is avocado pear.

10. A process for dehydrating avocado pulp comprising:

forming the pulp into a dispersion in an edible vegetable oil of finely divided solid particles of the pulp having particle sizes not in excess of about 100 microns, the dispersion having a viscosity not in excess of about 200,000 centipoises;

dehydrating the pulp particles by subjecting the dispersion to a vacuum at an elevated temperature, in a thin, agitated film, over a time period not in excess of about 10 minutes, and recovering a slurry of discrete, dehydrated particles of the pulp in the vegetable oil.

11. A process in accordance with claim 10 wherein the edible vegetable oil is sesame oil.

12. A process in accordance with claim 10 wherein the elevated dehydrating temperature does not exceed 65° C.

References Cited

UNITED STATES PATENTS

| 3,239,946 | 3/1966 | Forkner | 99—199 |
| 3,194,670 | 7/1965 | Dorsey et al. | 99—204 |
| 2,974,725 | 3/1961 | Samesreuther et al. | 159—6 |

OTHER REFERENCES

Stephens et al. Preparation of a Frozen Avocado Mixture for Guacamale, Journal of the Rio Grande Valley Horticultural Society, vol. XI, pp. 82–89, 1957.

Harrold, Avocado Preservation & Utilization, Hawaii Agricultural Experiment Station, pp. 19–22, 1930.

MORRIS O. WOLK, Primary Examiner

S. B. DAVIS, Assistant Examiner

U.S. Cl. X.R.

99—199, 208, 209